United States Patent [19]
Binegar

[11] 4,057,742
[45] Nov. 8, 1977

[54] VEHICLE LIGHT SWITCH APPARATUS

[76] Inventor: Ernest W. Binegar, 37 Indian Creek Road, New Smyrna, Fla. 32069

[21] Appl. No.: 668,706

[22] Filed: Mar. 19, 1976

[51] Int. Cl.² .............................................. H02G 3/00
[52] U.S. Cl. ................................. 307/10 LS; 315/82
[58] Field of Search ........................ 307/10 LS, 10 R; 315/82

[56] References Cited
U.S. PATENT DOCUMENTS

| 3,500,119 | 3/1970 | Price | 315/82 |
| 3,500,120 | 3/1970 | Schultz | 315/82 |
| 3,591,845 | 7/1971 | Vanderpoel | 315/82 |
| 3,600,596 | 8/1971 | Aloisantoni | 307/10 LS |
| 3,824,405 | 7/1974 | Glaze | 307/10 LS |

Primary Examiner—Robert K. Schaefer
Assistant Examiner—Morris Ginsburg

Attorney, Agent, or Firm—Duckworth, Hobby, Orman, Allen & Pettis

[57] ABSTRACT

A system for automatically turning on vehicle road lights responsive to the operation of the vehicle windshield wipers. The vehicle windshield wiper switch is connected by an electrical circuit to the road light switch of the vehicle. A first diode circuit connects the windshield wiper switch to the headlight actuation position of the road light switch so that a diode allows the headlight switch to override the vehicle light connection through the windshield wiper switch. A second diode circuit is connected to the first diode circuit and prevents the headlights from being disengaged through the windshield wiper switch when the parking lights are actuated. Heavier wiring between the battery and the ignition and between the ignition and the windshield wiper switch is required along with a heavier fuse and an auxiliary switch disengaging the windshield wiper headlight circuit when desired.

7 Claims, 1 Drawing Figure

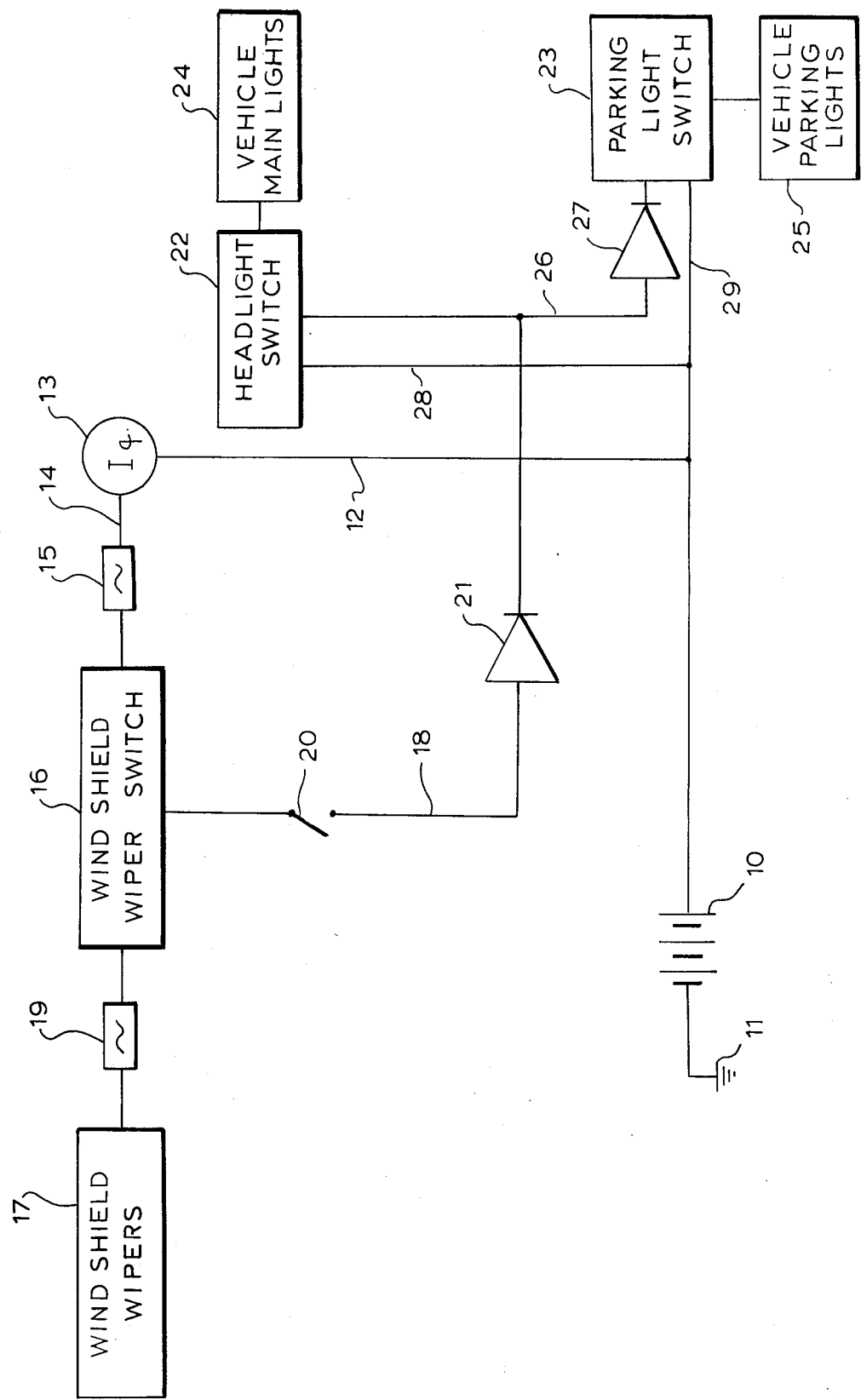

VEHICLE LIGHT SWITCH APPARATUS

BACKGROUND OF THE INVENTION

The present invention relates to a vehicle windshield wiper and road light connecting circuit and in particularly to an electrical circuit for activating the lights of a vehicle during operation of the windshield wipers.

DESCRIPTION OF THE PRIOR ART

In the past, vehicle - especially automobiles - have been provided with headlights, tail lights, instrument lights and other lights operated by a main switch on the panel of the vehicle which switch operates independently of windshield wipers used in cleaning the windshields of the vehicle during rainy or wet weather. Windshield wipers are normally actuated by a switch which is connected through the main ignition switch of the vehicle so that turning off the engine of the vehicle will turn off the windshield wipers automatically. Thus, when a person in rainy weather parks his car and turns off the ignition, the windshield wipers will automatically be turned off. The headlights and other lights of a car have usually been connected through a main light switch which operates separately from the ignition switch, and parking a car with the headlights or other lights on and turning the engine off will have no effect on the lights. This is done because there are many occasions when it is desirable to have the lights on with the motor not running. However, because safety officials are encouraging the use of headlights and taillights of an automobile during rainy or inclement weather, and since some states by statute require the lights to be on in rainy weather, the problem continuously arises of leaving the lights on after parking the vehicle. The operation of the lights during daylight hours is not normally visible to the driver who tends to forget that he turned the lights on when he parks the car. There is also a tendency to forget to turn the lights on during rainy weather and thus increase the hazard in driving in inclement weather while violating the statute in states requiring that they be turned on. The present invention advantageously overcomes these problems by providing a simple solid state circuit for switching the vehicle lights on whenever the windshield wiper is switched on without otherwise interfering with the operation of the main light switch of the vehicle, and turns the lights off when the car is stopped and the ignition is shut off.

In U.S. Pat. No. 3,500,119 and 3,500,120 safety automotive lighting circuits are provided in which the windshield wiper switch is inter-connected with the lighting switch. A similar electrical circuit is illustrated in U.S. Pat. No. 3,591,845 and in U.S. Pat. No. 3,824,405 an automatic wiper light control system is provided for automatically turning on the headlights and taillights of the motor vehicle when the vehicle windshield wipers are turned on but allows the windshield wipers to be operated without the lights, such as when watching drive-in movies in the rain. U.S. Pat. No. 3,600,596 teaches a vehicle light switch apparatus for turning the lights of a vehicle on and off automatically upon turning the windshield wipers for the vehicle on and off by the attachment of an electrical switching circuit to an existing vehicle. In my copending patent application Ser. No. 650,505 for a vehicle switch attachment, now U.S. Pat. No. 4,009,363, dated Feb. 22, 1977 I provide a switch knob which can replace the vehicle windshield wiper switch knob for actuating the vehicle headlights responsive to the actuation of the windshield wiper switch.

In contrast to these prior art inventions, the present invention teaches an electrical circuit which can be wired to connect a vehicle windshield wiper switch and a vehicle road light switch which will actuate the vehicle road lights when the windshield wiper switch is actuated but allow the vehicle light switch to override the windshield wiper switch.

SUMMARY OF THE INVENTION

A system is provided for automatically turning on vehicle road lights responsive to the operation of the vehicle's windshield wipers. The system includes a first diode circuit connecting a vehicle windshield wiper switch to the vehicle's road light switch main light position. For actuating the vehicle's lights when the windshield wipers are actuated, the diode in the circuit shuts off the circuit when the vehicles main lights are actuated. A second diode circuit is connected between the first circuit and the road light switch parking light position to prevent the disengaging of the windshield wiper first diode circuit when the road light switch is in the parking position and an override switch allows for disengaging the connection between the windshield wipers and the vehicle road lights. Heavier wiring is required between the battery and the ignition and between the ignition and the windshield wiper switch along with a larger fuse.

BRIEF DESCRIPTION OF THE DRAWING

Other objects, features, and advantages of the present invention will be apparent from the written description and the drawing in which the FIGURE is a schematic diagram of the present invention.

DESCRIPTION OF THE PREFERRED EMBODIMENT

Referring now to drawing FIGURE, a portion of a vehicle wiring circuit is illustrated having the vehicle battery 10 connected to a chassis ground 11 on one side thereof and having a connection from the other side thereof through a heavy conductor 12 to the ignition 13 of the vehicle. Circuit line 14 is connected through a fuse 15 to the windshield wiper switch 16 which is in turn connected to the windshield wipers 17 for actuating the windshield wipers upon actuation of the switch 16. It should be clear at this point that this is a fairly standard wiring diagram for typical road vehicles. However, in the present invention the ignition battery line 12 and the ignition to windshield wiper line 14 must both be replaced with heavier conductors and fuse 15 must be placed with a larger fuse. The windshield wiper switch 16 has a first circuit 18 connected thereto having an override switch 20 for disengaging the circuit 18 when the switch is opened as illustrated. Circuit 18 includes a diode 21 which would be a heavy duty power diode such as a 20 amp power diode selected to handle the amperage required to operate the vehicle lights. Circuit 18 is connected to the headlight switch 22 which is the main position of the vehicle's road light switch which also has a parking light switch portion 23 for actuating only the parking lights of the vehicle. It will of course be clear that the switches 22 and 23 are normally incorporated in one switch having two or more switch positions so that the switch 22 operates the head and taillights while the switch 23 actuates only the front and rear parking lights; and both switches can operate the dash gauge lights. The headlight switch portion 22 is connected to the vehicle's main lights 24 while the parking light switch is illustrated connected to the vehicle's parking lights 25.

A second diode circuit 26 has a diode 27 located therein and connecting the circuit 18 to the parking light switch 23. Diode 27 would normally be of a smaller power diode than diode 21 and could, for instance, be a 10 amp power diode. The circuit 18 is actuated by turning on the windshield wiper switch 16 to turn on the windshield wiper 17 which automatically engages the headlight circuit 18 when the override switch 20 is not switched off. The circuit 18 directly turns on the headlight switch 22 and vehicle lights 24 to operate the vehicle main lights including the headlights and taillights. Thus, in inclement weather when the windshield wipers are required the main lights of the vehicle are turned on as required by law in many states, but will not be left on when the operator parks his vehicle inasmuch as turning off the ignition switch 13 or the windshield wipers 16 will disengage the entire circuit thereby turning off the headlights. Most vehicles, however, have a main road light switch and a parking light switch position for actuating the vehicle parking lights and by turning the parking lights on to this position the main vehicle lights 24 would be disengaged when being actuated through the circuit 18 by the back load impressed upon the diode 21. This is prevented by the diode 27 thereby allowing the windshield wiper switch to maintain the headlight switch in its operative position. The headlight switch and headlights are connected through an electrical conductor 28 and 29 and are switched on and off without going through the ignition 13. It has been found that the operation of this circuit requires a load greater than the battery to ignition windshield wiper line 12 and windshield wiper switch 16 to ignition 13 could normally handle. With either conductor remaining in the circuit as originally wired increases the potential danger of a short and at the same time the windshield wipers 17 began to slow down and fail to operate after a short period of time. This problem is overcome by disconnecting the existing wires which are usually connected through a harness from the battery to the ignition and from the ignition to the windshield wiper switch and the adding heavier conductors 12 and 14 along with a heavier fuse 15. A separate fuse 19 can be added between the wiper switch 16 and wipers 17 for additional safety, if desired. It has been found that the existing ignition switch and windshield wiper switch can handle the added load of the light circuit being operated therethrough.

The present circuit is a simplified system for operating the road lights on a vehicle responsive to the windshield wipers, but it generally requires a more skilled person for the installation on existing vehicles. It should be clear at this point that a simplified circuit has been provided for the interconnection of windshield and lights of a vehicle to comply with existing state statutes, as well as improving safety in the operation of a vehicle and preventing the accidental discharge of a battery by leaving the headlights on. This invention is, however, not to be construed as limited to the particular forms disclosed herein since these are to be regarded as illustrative rather than restrictive.

I claim:

1. A system for automatically turning on vehicle lights responsive to the operation of the vehicle windshield wipers comprising in combination:

a vehicle windshield wiper switch located in a vehicle;

vehicle light switch means having a headlight switch and parking light switch;

a first circuit connecting said windshield wiper switch to said headlight switch of said vehicle light switch means;

a first diode located in said first circuit for operatively disengaging said first circuit responsive to actuation of said headlight switch;

a second circuit coupled between said first circuit and said parking light switch of said vehicle light switch means; and a second diode located in said second circuit for operatively disengaging said second circuit without disengaging said first circuit when said vehicle light switch means is connected to said parking light switch whereby said vehicle windshield wiper switch controls said vehicle lights unless over-ridden by said headlight switch.

2. The system in accordance with claim 1 in which said first diode is a power diode for handling a heavier amperage than said second diode.

3. The apparatus in accordance with claim 2 in which said first diode is rated for at least 15 amps and said second diode is rated for at least 5 amps.

4. The apparatus in accordance with claim 1, in which a conductor between the vehicle windshield wiper switch and ignition is a conductor rated to handle the additional load of the vehicle lights.

5. The apparatus in accordance with claim 4 in which a conductor connecting the vehicle battery source to the ignition for said windshield wipers is a heavier conductor for handling the additional load of the vehicle lights.

6. The apparatus in accordance with claim 5 in which a fuse is located between the vehicle windshield wiper switch and the windshield wipers.

7. The system in accordance with claim 1 in which an override switch is located in said first circuit for disabling said first and second circuits.

* * * * *